US006783456B2

(12) United States Patent
White

(10) Patent No.: US 6,783,456 B2
(45) Date of Patent: Aug. 31, 2004

(54) METHODS AND SYSTEMS FOR CONDUCTING LOTTERY-TYPE GAMES WITH STRATEGY ELEMENTS

(75) Inventor: Michael L. White, Las Vegas, NV (US)

(73) Assignee: Scientific Games Royalty Corporation, Newark, DE (US)

( * ) Notice: Subject to any disclaimer, the term of this patent is extended or adjusted under 35 U.S.C. 154(b) by 55 days.

(21) Appl. No.: 10/029,398

(22) Filed: Dec. 19, 2001

(65) Prior Publication Data

US 2003/0114211 A1 Jun. 19, 2003

(51) Int. Cl.[7] .................................................. A63F 13/00

(52) U.S. Cl. ....................... 463/18; 463/16; 273/144 R; 273/138.2

(58) Field of Search .............................. 463/16–22, 25, 463/40–42; 273/138.1, 139, 138.2, 143 R

(56) References Cited

U.S. PATENT DOCUMENTS

| | | | | |
|---|---|---|---|---|
| 4,033,588 A | * | 7/1977 | Watts | 463/18 |
| 4,375,666 A | | 3/1983 | Buck et al. | 364/410 |
| 5,326,104 A | | 7/1994 | Pease et al. | 273/138 |
| 5,564,700 A | | 10/1996 | Celona | 463/27 |
| 5,816,920 A | | 10/1998 | Hanai | 463/42 |
| 5,885,158 A | | 3/1999 | Torango et al. | 463/27 |
| 6,017,032 A | | 1/2000 | Grippo et al. | 273/138.1 |
| 6,080,062 A | | 6/2000 | Olson | 463/42 |
| 6,125,368 A | | 9/2000 | Bridge et al. | 707/201 |
| 6,168,521 B1 | | 1/2001 | Luciano et al. | 463/18 |
| 6,203,430 B1 | | 3/2001 | Walker et al. | 463/20 |
| 6,210,275 B1 | | 4/2001 | Olsen | 463/16 |
| 6,331,143 B1 | | 12/2001 | Yoscloff | 463/18 |
| 6,394,899 B1 | | 5/2002 | Walker | 463/9 |
| 2001/0027130 A1 | | 10/2001 | Namba et al. | 463/42 |
| 2001/0030978 A1 | | 10/2001 | Holloway et al. | 370/503 |
| 2002/0187825 A1 | * | 12/2002 | Tracy et al. | 463/17 |

FOREIGN PATENT DOCUMENTS

| | | |
|---|---|---|
| EP | 0 458 623 | 11/1991 |
| WO | WO 98/03910 | 1/1998 |
| WO | WO 99/26204 | 5/1999 |
| WO | WO 99/39312 | 8/1999 |
| WO | WO 02/056266 | 7/2002 |

OTHER PUBLICATIONS

Point & Non–Poker Games for Seven–Twenty–Seven, [ht-tp:pokertable.com/gamenon.html], page last updated Feb. 12, 2000, pps 1–5.*

International Search Report (counterpart PCT application).

* cited by examiner

*Primary Examiner*—Jessica Harrison
*Assistant Examiner*—Aaron Capron
(74) *Attorney, Agent, or Firm*—Arnall Golden Gregory LLP

(57) ABSTRACT

The present invention provides methods and systems for interactively playing a lottery-type game among a number of players. In one embodiment, this is accomplished on a network of gaming terminals in communication with a central controller. An objective of the game is for a player to select the number closest to the randomly selected number that represents the winning number for the lottery game. This is a significant departure from the prior art, in that the game of the present invention does not require an exact match to produce a win and in that the game results in a win for every drawing. Thus, the lottery-type game of the present invention improves the gaming experience for the player, which will result in prolonged and more frequent play, thereby maximizing revenues for the operator of the game.

9 Claims, 10 Drawing Sheets

METHODS AND SYSTEMS FOR CONDUCTING LOTTERY-TYPE GAMES WITH STRATEGY ELEMENTS

BACKGROUND OF THE INVENTION

1. Field of the Invention

The present invention relates to games of chance and, more particularly, to methods and systems for conducting lottery-type games that allow players to use their mental skills to attempt to strategically select lottery numbers that increase the probability of obtaining a favorable outcome.

2. State of the Art

Lottery games have been available for hundreds of years, if not longer. In a conventional lottery game, players are allowed to select potentially winning numbers from a pool of available numbers. The winning number, or numbers, is determined on the basis of a random drawing from the pool of available numbers. The player(s), if any, whose selected number(s) exactly matches the randomly drawn winning number(s) wins the game and the award/jackpot associated therewith. This standard model for lottery games suffers from the following disadvantages: (1) players can become discouraged from playing such lottery games by the fact that drawings often result in no win, and (2) it is impossible for the operator of the lottery game to predict the frequency of the occurrence of a win.

The basic lottery game concept has remained essentially unchanged over the centuries. Some embellishments have, however, been made. These embellishments include, for example, allowing a player to participate in a series of lotteries to parlay any winnings into successive lottery draws. However, none of these embellishments has altered the fundamental nature of the lottery as being unaffected by player skill. Because no skill is involved in lottery games, player interest often wanes and is only revived momentarily by the potential for winning massive jackpots. Many players become discouraged from playing lottery games entirely because the vast majority of lottery players win nothing, so even the enticement of a large jackpot is of limited appeal.

In recent years, casino gaming and lottery games have experienced a tremendous amount of growth. As the number of casinos and other gaming outlets has increased, competition to attract customers similarly has become more intense. Consequently, not only has there been a need for gaming operators to attract new customers, but the need to retain old customers has become more compelling. Customer retention becomes increasingly difficult as games, even ones that have been successful at one time, become well played and, thus, provide diminishing entertainment value for players. As a result, there is a continuing need for participants in the gaming industry to develop new games that are exciting and entertaining. Games that retain their excitement and entertainment value, even after being played many times, are particularly sought after.

The current generation of casino gaming machines typically involves the generation of a random or quasi-random outcome, which is matched against preselected potential winning combinations to determine whether a win has occurred. These games are represented by conventional gaming machines, also known as "slot" machines.

Many new games have been developed in recent years that attempt to capitalize on the tremendous growth of the gaming industry. Most of these games, however, are variations on conventional casino gaming machines, which involve minimal player participation in the outcome of the gaming event. Hence, these new games do little to improve the entertainment value of the gaming experience over the prior art.

A number of different approaches have been pursued in attempts to increase player interest in conventional gaming machines. Among these approaches has been a proliferation of games that add a bonus game to a base or primary game of a gaming machine. However, even with a bonus game, the player only provides some minimal physical input (such as pushing a button, pulling a lever, or touching a touch screen) to start the gaming machine's random determination of the bonus game outcome. Efforts to increase player interest have also involved theming games to popular television shows, movies, and celebrities to attract customers.

Nevertheless, bonus games and theme enhancements still rely upon conventional gaming machines and determine a player's game outcome completely independent of player action. Once the novelty of one of these gaming machines incorporating a bonus game or theme is exhausted, its popularity and success may end prematurely, and the resulting diminution of patronage forces such gaming machines off the casino floor at significant cost to the casino and, in many instances, the provider of the gaming machine.

Lottery gaming has become very popular with a large segment of the populations of the various jurisdictions in which it is offered. Exemplary prior art lottery-type games are described in U.S. Pat. Nos. 6,017,032, 6,080,062, and 6,168,521, the disclosures of each of which patents are incorporated herein by reference. One advantage of lottery-type games is that they are, in many cases, permissible in jurisdictions in which casino-style gaming is prohibited. Therefore, lottery-type games represent a significant opportunity for the gaming industry, and gaming machine providers in particular, to realize a broader market base.

Some lottery games involve the purchase of a ticket at, for example, a retail outlet, such as a convenience store, the ticket providing a potential for a winning result in a periodic drawing. Other lottery games provide so-called "instant" wins for the purchaser, wherein the result of the game is made known to the player immediately upon purchasing his ticket.

One important drawback associated with conventional lottery-type games is that it is impossible to predict with certainty whether any particular drawing will result in a player winning the game. For example, it is often the case that the number selected at random as the winning number has not been selected by any player. There is no winner in such a scenario, although the uncollected jackpot customarily is folded into the jackpot for the next game. This can cause a significant degree of player antipathy for, or at least disinterest in, the game because the player does not sense any denouement in the game when no one wins. Thus, it would be advantageous from the perspective of player entertainment and satisfaction to provide a lottery-type game in which someone wins at every single drawing. It would also be advantageous from the perspective of gaming operators to provide such a lottery-type game because such would enable the gaming operators to better market the games and have a more predictable economic model of the game.

To revive and maintain player interest in lottery games, a new type of lottery game is needed. As is set forth more fully hereinafter, the present invention provides such a new type of lottery game, which allows players to use their mental skills to strategically and tactically select lottery numbers that have the greatest probability of producing a favorable outcome.

BRIEF SUMMARY OF THE INVENTION

According to an aspect of the invention, a gaming method includes determining that a first player has made a wager, determining that a first player has selected one of the game elements from the set of game elements, the one of the game elements known to the first player at the time the one of the game elements is selected, determining that a second player has made a wager, and determining that a second player has selected one of the game elements from the set of game elements, the one of the game elements known to the second player at the time the one of the game elements is selected. The gaming method also includes selecting a winning game element from the set of game elements, determining a game outcome according to the closeness of the one of the game elements selected by the first player and the one of the game elements selected by the second player to the winning game element, and determining a payout according the game outcome.

According to another aspect of the invention, a gaming method includes determining that each of a plurality of players has made a wager, determining that each of the plurality of players has selected at least one number from a set of numbers, the at least one number known at the time the at least one number is selected, selecting at least one winning number from the set of numbers, determining a game outcome according to the closeness of the at least one number selected by each of the plurality of players to the at least one winning number, and determining a payout according the game outcome.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
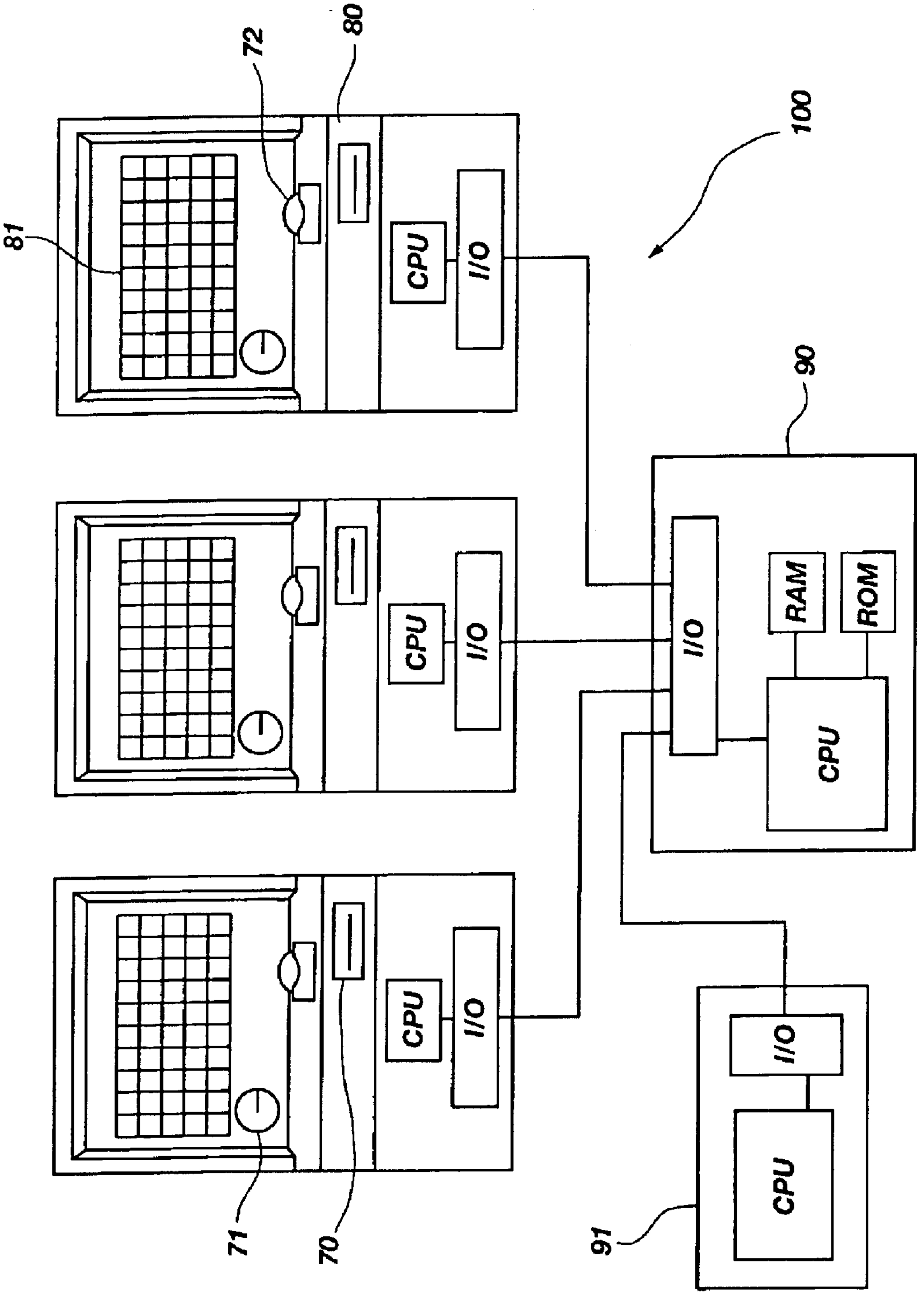
FIG. 1 schematically depicts a system for implementing an embodiment of the present invention utilizing a central controller to coordinate networked gaming terminals.

The present invention includes a gaming method and system for use in casino, government-sponsored lottery, and other gaming environments. The present invention may be implemented over a distributed network of casino, retail outlet, or other gaming terminals 80 in communication with a central controller 90. The central controller 90 is configured to communicate in a secure manner with the gaming terminals 80 substantially in real-time to process incoming data from the gaming terminals 80 and to output data to each of the terminals. Similar elements and features used in different portions of the system are identified in the drawings with like reference numerals.

Figure 2:
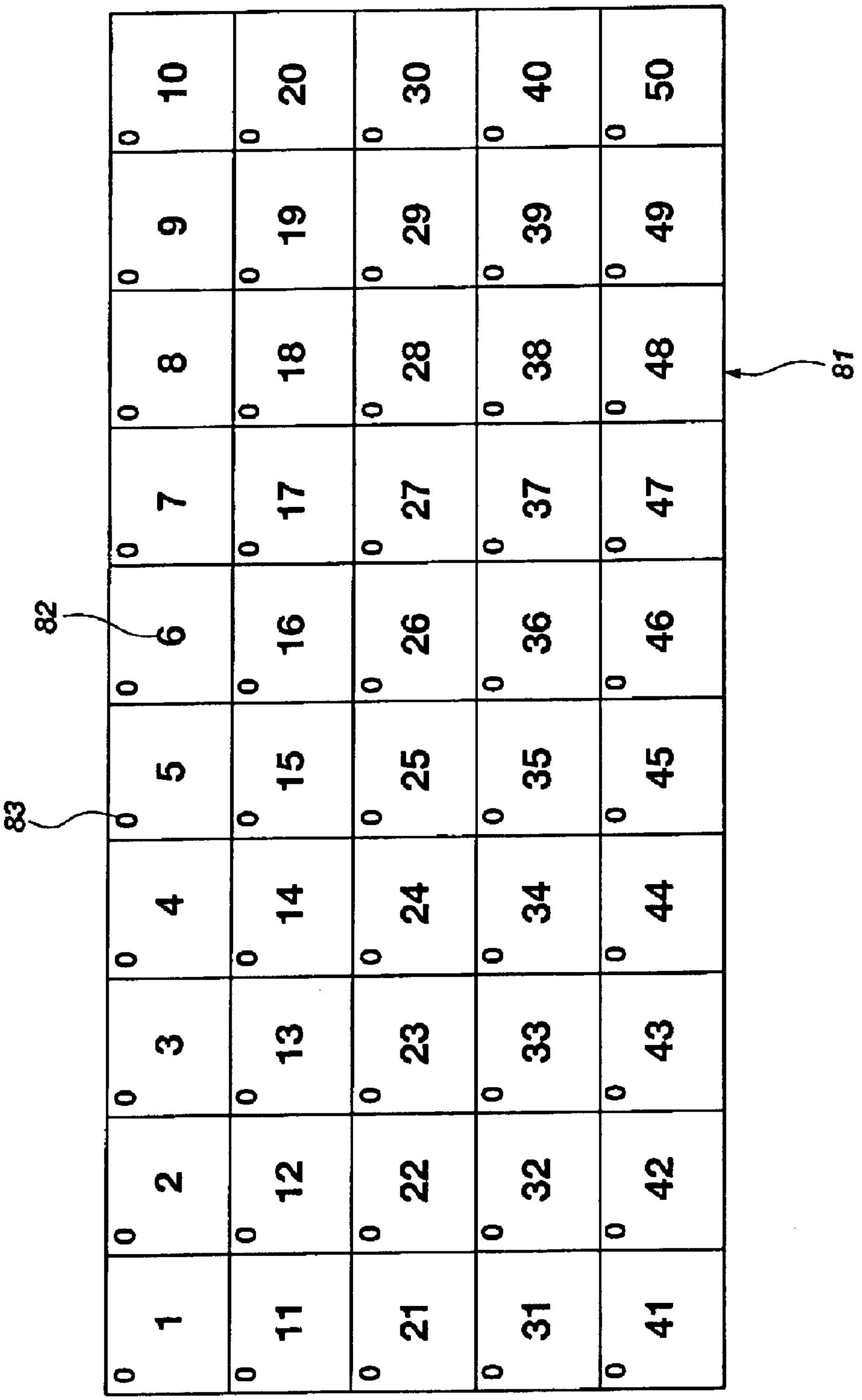
FIG. 2 depicts an embodiment of a gaming terminal display for representing player selectable numbers.

An exemplary gaming system 100 for implementing the present invention is depicted in FIG. 1. The gaming system 100 includes a central controller 90 in communication with a plurality of gaming terminals 80. The central controller 90 may also be in communication with a workstation 91 to allow an attendant to monitor the progress of the game and the equipment on the network. The gaming terminals 80 each have a gaming terminal display 81 and a wager acceptor 70. In addition, the gaming terminal 80 has a selection mechanism (unnumbered) that allows a player to select a specific number from the range of player selectable numbers 82 (FIG. 2). The selection of these numbers may be made from the gaming terminal 80 through a selection mechanism in the form of a touch screen, a key pad, a mouse, a mouse pad, a light pen, or any suitable pointer or cursor control mechanism that enables players to select desired numbers from an array of numbers on gaming terminal displays 81.

Figure 8:
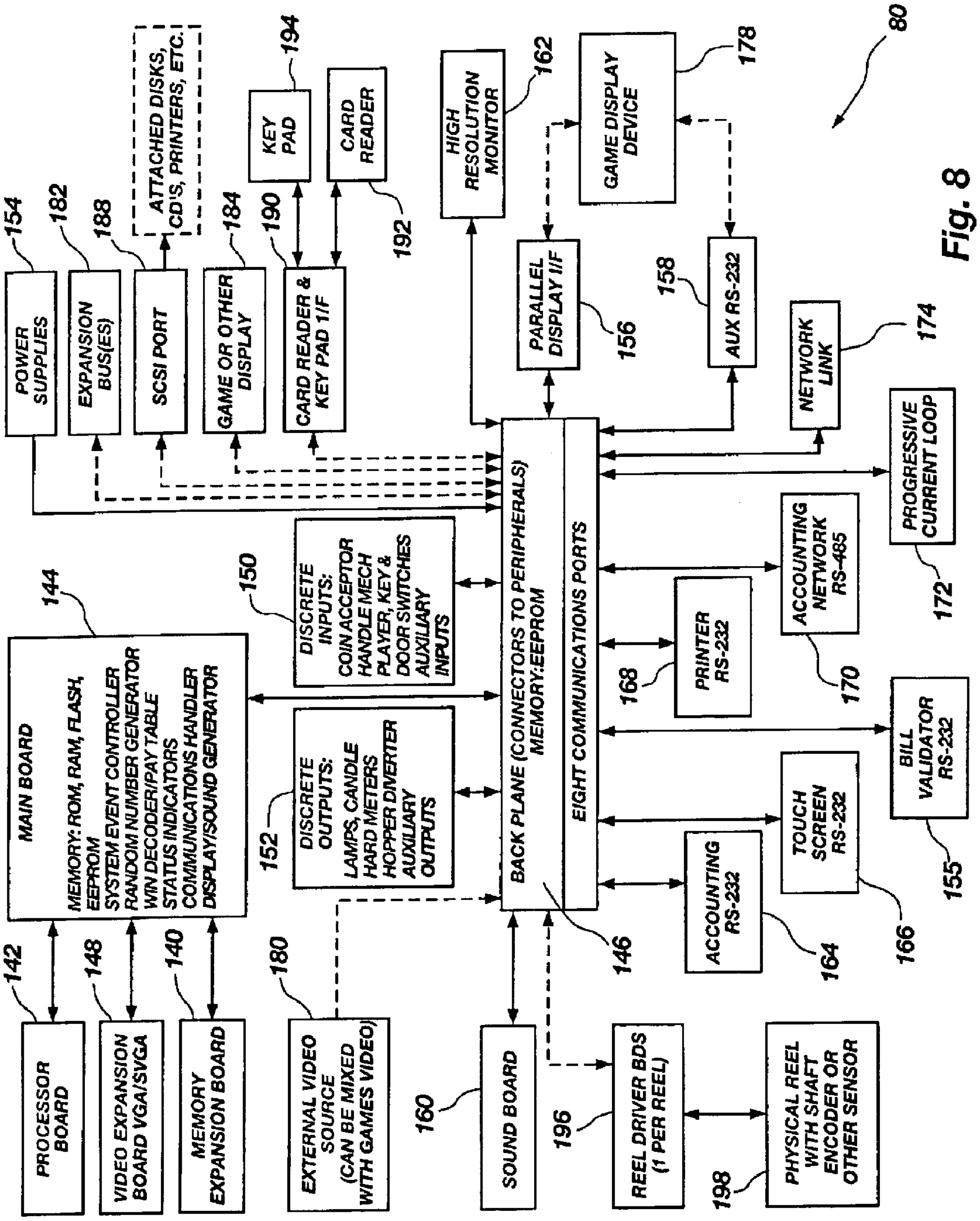
FIG. 8 is a block diagram of components of an exemplary gaming terminal.

In use and operation, and referring to FIG. 8, each gaming terminal 80 may be structured in a manner similar to a conventional gaming machine and include many of the components thereof, including those affording a capability for play of a primary game of chance thereon (e.g., reel-type slot machine games, video poker games, video blackjack games, video Keno, video bingo or any other suitable primary games) when not employed as a gaming terminal 80 for the lottery-type game of the present invention. By way of example only, such components include a main board 144 and a back plane 146 integrally or separately formed. Memory expansion board 140 as well as processor board 142 including a graphics system processor and video expansion board VGA/SVGA 148 are operably coupled to the main board 144. The main board 144 preferably includes memory in the form of ROM, RAM, flash memory and EEPROM (electrically erasable programmable read only memory). In addition, the main board 144 includes a system event controller, a random number generator, a win decoder/pay table, status indicators, a communications handler and a display/sound generator.

The main board 144 is operably coupled to the back plane 146, which may include additional memory, such as in the form of an EEPROM, and connectors to connect to peripherals. Furthermore, the back plane 146 provides a plurality of communication ports for communicating with external peripherals. The back plane 146 provides the coupling between discrete inputs 150 and the processor board 142 and main board 144. Typical examples of elements which provide discrete inputs 150 are coin acceptors, game buttons, mechanical hand levers, key and door switches and other auxiliary inputs. Furthermore, the back plane 146 provides the coupling between discrete outputs 152 and the processor board 142 and main board 144. Typically, elements that provide discrete outputs 152 are in the form of lamps, hard meters, hoppers, diverters and other auxiliary outputs.

The back plane 146 also provides connectors for at least one power supply 154 for supplying power for the processor board 142, a parallel display interface (PDI) 156 and a serial interface 158 for at least one game display device 178. In addition, the back plane 146 also provides connectors for a sound board 160 and a high-resolution monitor 162. Furthermore, the back plane 146 includes communication ports for operably coupling and communicating with an accounting network interface 164, a touch screen 166 (which may also serve as a game display device), a bill validator 155 incorporated in a currency (bill) acceptor, a printer 168, an accounting network 170, a progressive current loop 172 and a network link 174.

The back plane 146 optionally includes connectors for external video sources 180, expansion buses 182, game or other displays 184, an SCSI port 188 and an interface 190 for at least one card reader 192 (debit/credit, player card, etc.) and key pad 194. The back plane 146 may optionally include means for coupling a plurality of reel driver boards 196 (one per reel) which drive physical game reels 198 with a shaft encoder or other sensor means to the processor 148 and main board 144 for implementation of a primary game of chance on gaming terminal 80 for play in a casino-style gaming environment when gaming terminal is not being used for the lottery-type game of the present invention. Of course, the reels may be similarly implemented electronically by display as video images, technology for such an approach being well known and widely employed in the art. In such an instance, reel driver boards 196 and physical game reels 198 with associated hardware are eliminated and the game outcome generated by the random number generator on main board 144 is directly displayed on a video game display 184 and, optionally, on a separate game display device 178, as known in the art. Other gaming machine configurations for play of different primary wagering games such as the aforementioned video poker games, video blackjack games, video Keno, video bingo or any other suitable primary games are equally well known in the art.

It will also be understood and appreciated by those of ordinary skill in the art that selected components of gaming terminal 80 may be duplicated for play of a lottery-type game or event in accordance with the present invention, with associated peripherals and links thereto. It is contemplated that a gaming terminal 80 may, in one implementation, be configured solely as either a stand-alone gaming terminal for play of the lottery-type game or event in accordance with the present invention or as a remote terminal for enabling such play in communication with a central controller which administers the game. It is also contemplated that the lottery-type game of the present invention may be implemented in the form of a bonus game played on gaming terminals 80 each operably coupled as a "top box" or otherwise associated with a conventional, existing gaming machine configured for play of a primary game. In such an instance, at least some of the components illustrated in FIG. 8 and described with respect thereto will be duplicated, including separate software and associated memory for conducting play of the lottery-type game using gaming terminals 80 for either stand-alone bonus game play in accordance with the present invention or as remote terminals in communication with a central controller which administers bonus game play in accordance with the present invention to a plurality of gaming terminals 80.

Figure 9:
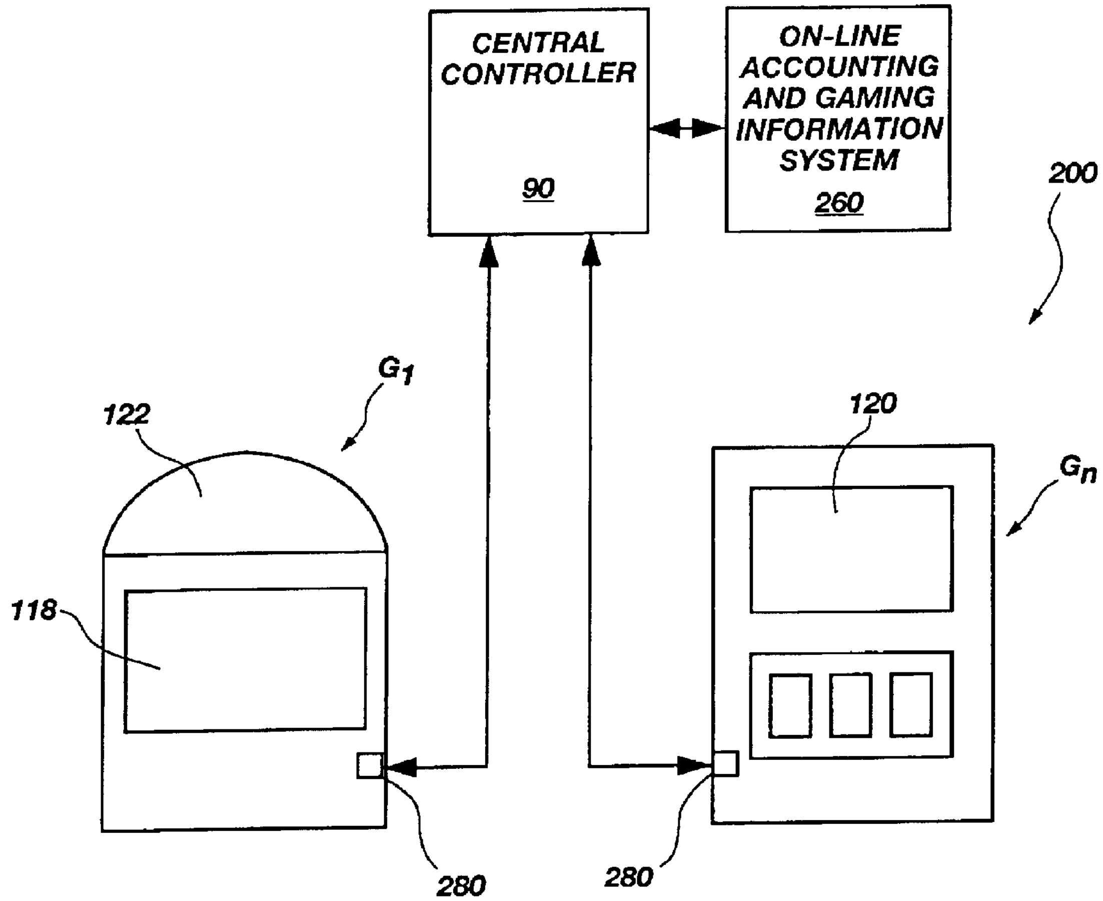
FIG. 9 is a block diagram of an exemplary gaming network.

In an exemplary implementation of the present invention, gaming machines serving as gaming terminals 80 offering play of the game of the present invention may be deployed, as schematically depicted in FIG. 9, in a gaming network 200 including a central controller 90 operably coupled to a plurality of gaming machine $G_1$, $G_2$ . . . $G_n$. The central controller 90 automatically interacts with a plurality of gaming machines $G_1$, $G_2$ . . . $G_n$ when employed as gaming terminals to administer the lottery-type game of the present invention.

More specifically, the gaming network 200 includes a central controller 90 and a plurality of gaming machines $G_1$, $G_2$ . . . $G_n$. Each gaming machine $G_1$, $G_2$ . . . $G_n$ includes a controller assembly 280 operably coupled to the central controller 90 and is comprised of a controller unit designed to facilitate transmission of signals from each individual gaming machine $G_1$, $G_2$ . . . $G_n$ to central controller 90 for monitoring and interaction. In addition, the controller assembly 280 includes a network interface board fitted with appropriate electronics for each specific make and model of each individual gaming machine $G_1$, $G_2$ . . . $G_n$.

Referring to FIG. 9, in electronic video games, the central controller 90 is operably coupled to at least one video game display element 118 as shown at the left hand side of FIG. 9 and sequesters a portion of the video game display element 118 for displaying video attract sequences to attract potential players. Video game display element 118 may be used for display of the lottery-type game in accordance with the present invention as well as for other games when not in such use. Where the gaming network 200 includes game machines $G_1$, $G_2$ . . . $G_n$, as shown at the right hand side of FIG. 9, the central controller 90 may be operably coupled to at least one active display element 120 so that potential players receive a clear indication of attract sequences, and the active display element 120 may be used as a video display for the lottery-type game of the present invention. It should be noted that gaming machines $G_1$, $G_2$ . . . $G_n$ on the right hand side of FIG. 9 depict a reel-type game display which may be used in conjunction with a primary game of that type when the lottery-type game of the present invention is not being played. As shown at the left hand side of FIG. 9, the gaming machines $G_1$, $G_2$ . . . $G_n$, may also be provided with a second video display element 122 as an alternative to sequestering a portion of the video game display element 118 for displaying video attract sequences, etc. In addition, the central controller 90 may include sound generating hardware and software for producing attractive sounds orchestrated with the video attract sequences at each of gaming machines $G_1$, $G_2$ . . . $G_n$ if such is not already incorporated therein. The games support input and output between the player and the game for such devices as heads up display, joystick, keyboard, mouse and data glove via interface modules connected through the expansion bus or buses 182 and SCSI port 188.

The attractive multimedia video displays and dynamic sounds may be provided by the central controller 90 by using multimedia extensions to allow gaming machines $G_1$, $G_2$ . . . $G_n$ to display full-motion video animation with sound to attract players to the machines. During idle periods, the gaming machines $G_1$, $G_2$ . . . $G_n$ preferably display a sequence of attraction messages in sight and sound. The videos may also be used to market specific areas of the casino and may be customized to any informational needs.

Preferably, the gaming network 200 further includes a real-time or on-line accounting and gaming information system 260 operably coupled to the central controller 90. The accounting and gaming information system 260 may include a player database for storing player profiles, a player tracking module for tracking players and a pit, cage and credit system for providing automated transactions.

Figure 10:
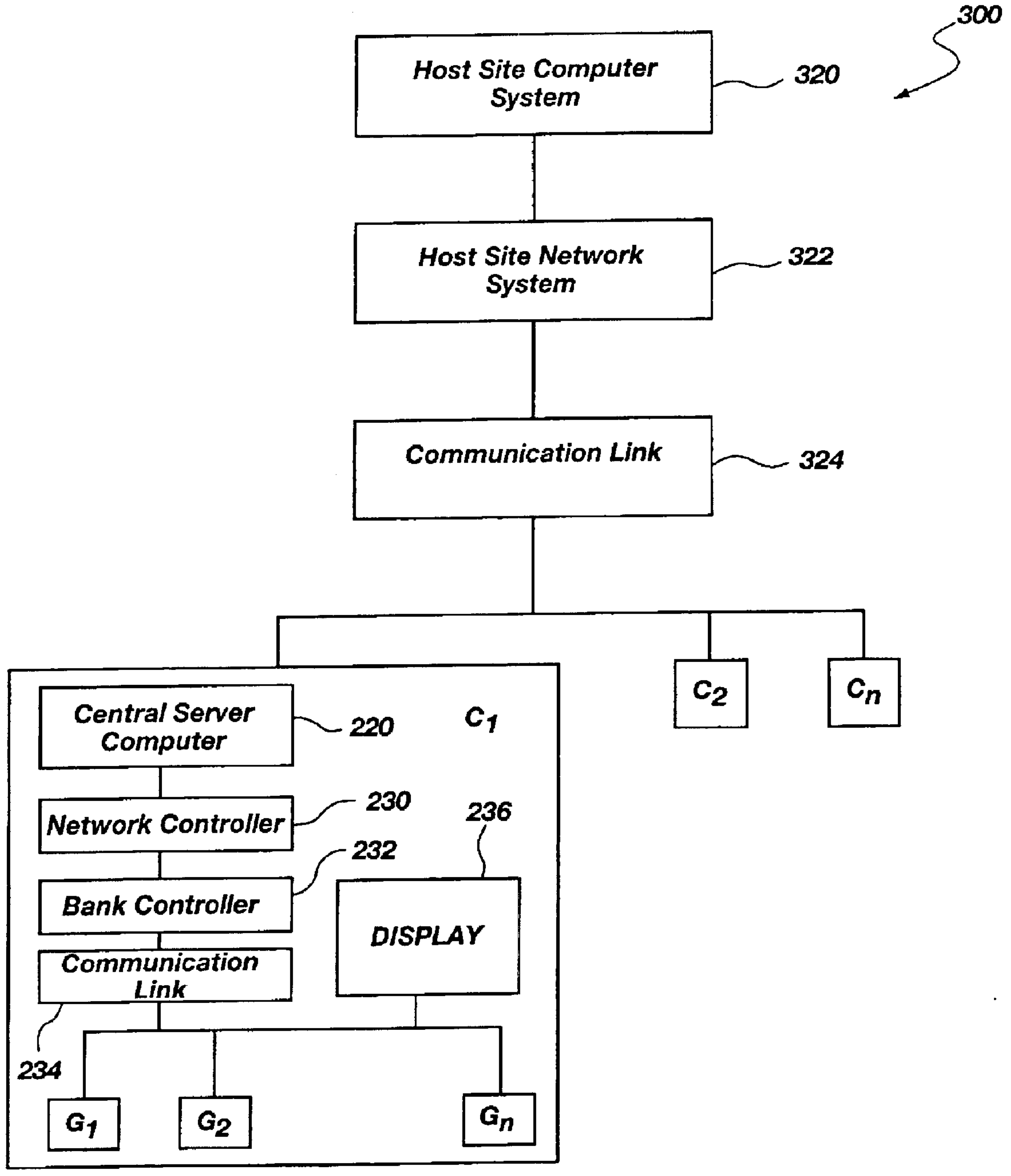
FIG. 10 is a block diagram of an exemplary multi-site gaming system.

Referring to FIG. 10, a host site computer 320 may be coupled to a plurality of central controllers 90 at a variety of casino or other mutually remote gaming sites $C_1$, $C_2$ . . . $C_n$ for providing a multi-site automated gaming system 300.

Preferably, in a multi-site automated gaming system 300, the host site computer 320 will be maintained for the overall operation and control of the system 300 and overall control and administration of the lottery-style game of the present invention. The host site computer 320 includes a computer network 322 and a communication link 324 provided with a high-speed, secure modem link for each individual casino site or other gaming site $C_1, C_2 \ldots C_n$.

Each casino or other gaming site $C_1, C_2 \ldots C_n$ may include a central controller 90 provided with a network controller 230 which includes a high-speed modem operably coupled thereto. With such an implementation, central controllers 90 serve as site administrators for the lottery-type game of the present invention in communication with host site computer 320, which administers the game. Bidirectional communication between the host site computer 320 and each casino site central controller 90 is accomplished by the set of modems transferring data over communication link 324.

A network controller 230, a bank controller 232 and a communication link 234 are interposed between each central controller 90 and the plurality of attached gaming machines at each casino or other gaming site $C_1, C_2 \ldots C_n$. In addition, the network controller 230, the bank controller 232 and the communication link 234 may optionally be interposed between each central controller 90 and at least one separate display 236 at each casino or other gaming site $C_1, C_2 \ldots C_n$. However, the system 300 may include hardware and software to loop back data for in-machine meter displays to communicate with lottery event award insert areas on gaming machines $G_1, G_2 \ldots G_n$.

Play of the lottery-type game of the present invention for each player is initiated by input of a wager in a lottery wager acceptor 70, which may be separate from that for an associated primary game, to maintain separation and integrity of wager pools for each game. The amount of the wager may be determined in the discretion of the operator of the game. For example, a wager of $1.00 may give a player one opportunity to select a number. In another embodiment, the first wager made by a player may give the player more than one selection as an inducement to commence playing the game. In other embodiments, larger wager amounts may be rewarded with extra selections in a number disproportionately larger than the larger wager. For example, where the minimum wager is $1.00 for one selection, a player who wagers $5.00 may be given six selection opportunities as a reward for wagering the larger amount. As game play progresses, players are allowed to wager additional amounts to acquire additional selection opportunities in order to counter the selections made by other players.

In other embodiments, the gaming terminal 80 is also equipped with a selection submission input confirmation element 72 that the player must actuate to effect submission of his number selection to the central controller 90. A non-limiting example of selection submission input confirmation element 72 is a large button. The purpose of the selection submission input confirmation element 72 is to provide the player an opportunity to have a tangible, physical experience concomitant with the mental experience of the game. The selection submission input confirmation element 72 is designed to withstand a sufficient amount of physical punishment from players that it can act as a physical outlet for the excitement and stress that is produced by play of the game without resulting in damage to the player or the gaming terminal 80. In further embodiments, each actuation of the selection submission input confirmation element 72 by any player is accompanied by a sound or other indication so that all players are made aware that a selection has been submitted. Additionally, the physical action of players submitting selections by pushing the selection submission input 72 gives other players in the same location an added form of notice that an opponent selection has been made, which encourages further wagers/selections in strategic response to such opponent selections.

Inviting players to actuate the selection submission input confirmation element 72 to submit their selections to the central controller 90 emphasizes the finality of the selection in the player's mind, which may amplify the excitement associated with the player's strategy. As players of the game are competing directly with each other, and as players have the opportunity to counteract or otherwise potentially interfere with the strategies of other players, the act of actuating the selection submission input confirmation element 72 additionally provides a harmless release for the competitive spirit and aggression that may develop among the players. In addition, the spectacle of players vigorously and/or excitedly actuating the selection submission input confirmation element 72 will be visible to passersby and may induce increased spectator interest in watching and/or playing the game. In other words, this physical aspect of the invention provides an added element of entertainment value to both players and spectators that is not found in conventional lottery-type games.

An objective in play of the present invention is to select the number closest to the randomly drawn number. As used herein, the term "closest" may be defined as mathematically closest (absolute mathematical value) as explained below with respect to FIGS. 2–6 or physically closest on a game display as explained below with respect to FIG. 7, according to the game architecture. At each gaming terminal 80 of the invention, a player is presented with a gaming terminal display 81 that contains a range of player selectable numbers 82, such as a matrix of numbers 1 through 50, as shown in FIG. 2. Although the numbers 1 through 50 are used in FIGS. 2–6, any range of numbers is applicable for use in the present invention and in practice, a much larger range of numbers, for example numbers 1 through 2500 (on a fifty by fifty matrix), may be employed. As no numbers have been selected in FIG. 2, it depicts the starting point for play of the game. After a player makes a wager, he may select a number from those shown on the gaming terminal display 81.

Figure 7:
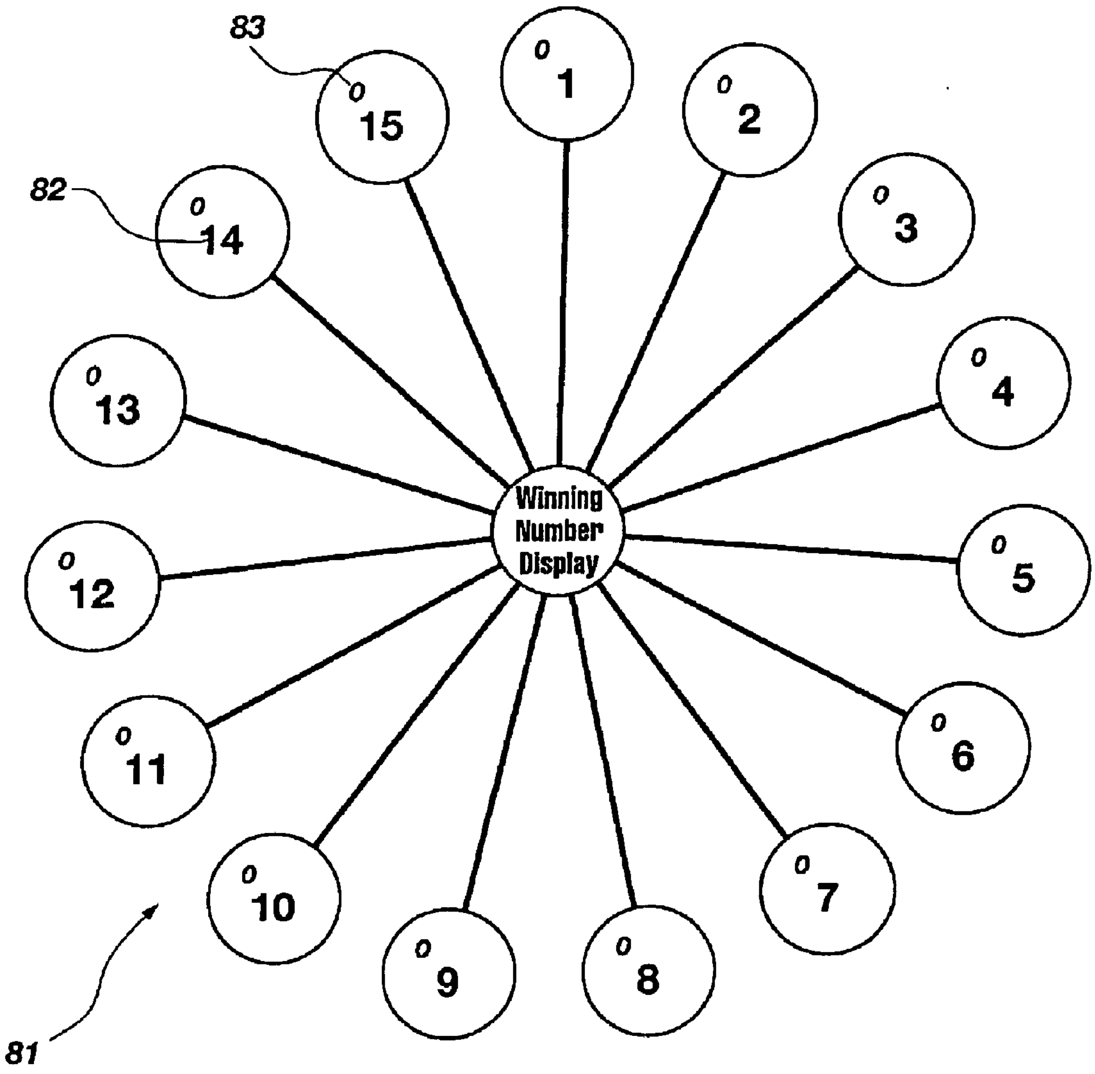
FIG. 7 depicts an alternative configuration for a gaming terminal display.

FIG. 7 depicts an alternative gaming terminal display 81 configuration that shows a pre-game initialization display as represented in FIG. 2, except the range of player selectable numbers 82 in FIG. 7 is shown as 1 through 15, displayed at the end of spokes surrounding a central position for display of a winning number. In this embodiment, the term "closest" number to a winning number would be the physically closest number on the gaming terminal display 81. Those of ordinary skill in the art will understand and appreciate that the gaming terminal display 81 may be configured in any manner (FIGS. 2 and 7 being non-limiting examples), with any number of player selectable numbers 82, consistent with the general principles of the game as described herein. As used herein in reference to ranges of player selectable numbers, the term "linear" or "open loop" means and encompasses a display range having a beginning and an end, as in the range depicted in FIG. 2, and the term "continuous" or "closed loop" means and encompasses a display range that loops back on itself, as in the range depicted in FIG. 7.

As noted above, the configuration depicted in FIG. 7 represents a variation on the determination of which number is "closest" to the winning number 86. This is because the configuration of FIG. 7 places the lowest and highest player selectable numbers adjacent each other, thereby creating a closed loop. Unlike the open loop configuration depicted in FIGS. 2 through 6, in which the lowest and highest numbers are endpoints of the range, there are no endpoints in the range of player selectable numbers shown in FIG. 7. Therefore, in a game scenario in the embodiment of FIG. 7 in which the winning number is the highest number, a player who has selected the lowest number can achieve a win as having selected the number physically closest in the closed loop to the winning number, notwithstanding the fact that the lowest number is sequentially the furthest from the winning number.

The number selected by the player is transmitted to the central controller 90. The central controller 90 receives the numbers selected by each player and promptly updates each gaming terminal display 81 to reflect each player's selections substantially in real-time. Thus, all of the numbers selected by all the players participating in the same lottery event are displayed, or otherwise indicated, on each gaming terminal display 81 of such players in the same lottery event.

As the game of the present invention may be won by selecting the number closest to the randomly drawn winning number, rather than only by selecting the number exactly matching the winning number, players are enabled to maximize their chances of winning by selecting numbers that effectively "block out" a range of potentially winning numbers. Because all players are privy to the selections of all other players substantially in real-time, a player may use the information feedback provided by the gaming terminal display 81 to tactically and strategically select numbers. As numbers are selected and displayed, the player may make reasonable judgments regarding the distribution of the numbers he selects in view of the distribution of numbers selected by opponent players to attempt to determine a strategy that maximizes that player's probability of achieving a favorable outcome. Each player's strategy and tactics will necessarily impact the strategy and tactics of all other players, which gives players an incentive to wager additional finds in order to make additional selections to counter other players' selections.

Figure 3:
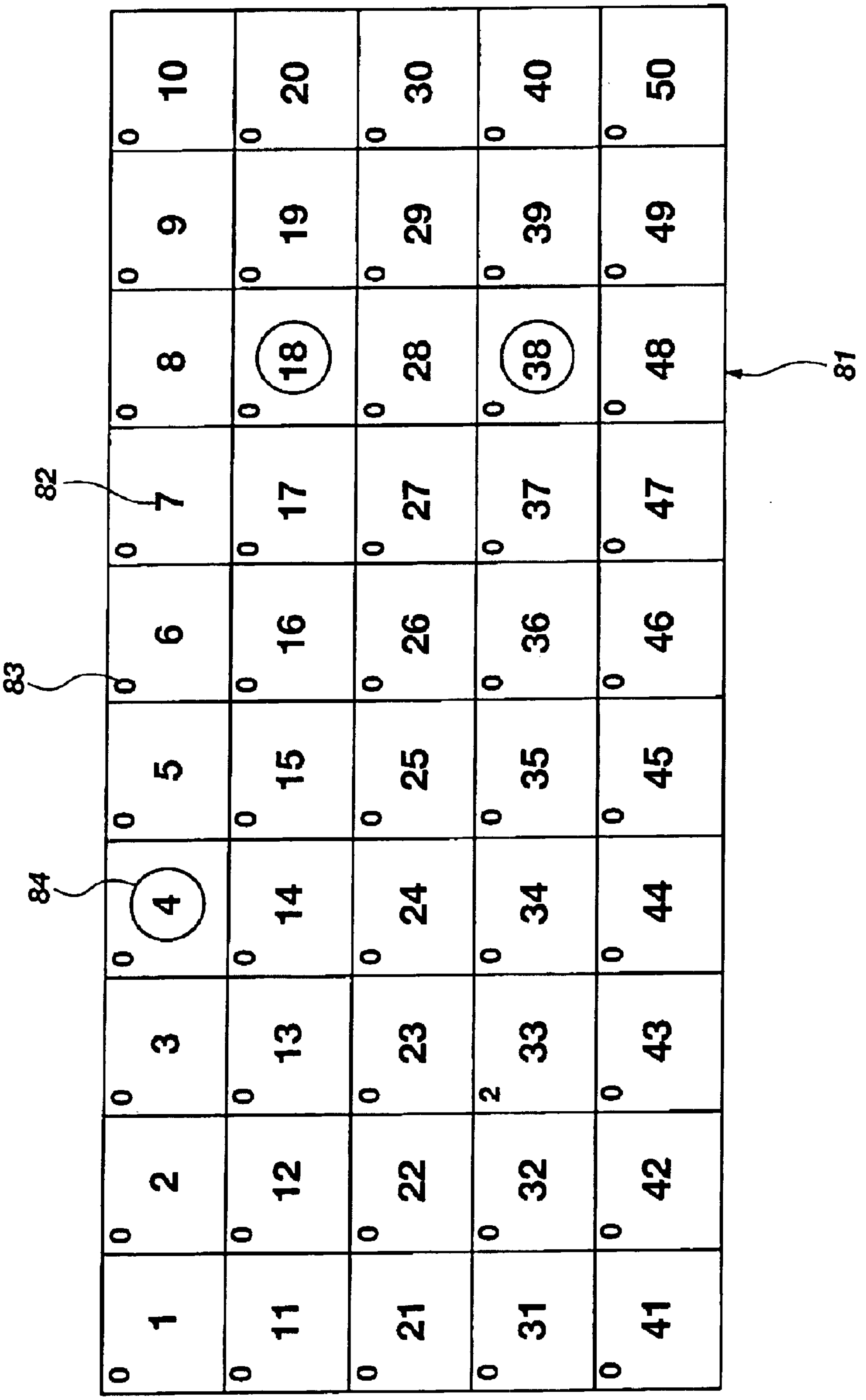
FIG. 3 depicts an example of player number selections indicated on the gaming terminal display of FIG. 2 during the opening stages of the game.

An example of this strategy is shown in the game play sequence depicted in FIGS. 3 through 6. Although this game can be played between a multitude of players, the example set forth assumes only two players, A and B, to simplify the present game strategy example. As shown in FIG. 3, which depicts the start of the game, the player selected numbers 84 appear on the screen as shown by Player A's selection of the numbers 4, 18, and 38 (indicated by the circle around the selected numbers). At the stage of game play depicted in FIG. 3, Player A effectively has control over the entire range of player selectable numbers 82. At the same time, other players may also be selecting numbers at other gaming terminals, participating in the same lottery event for the same award. The substantially real-time nature of the game, in combination with high-speed data links for communication between gaming terminals and central controller 90 minimizes the possibility for conflicting number selection by different players. To further reduce any probability of conflicting number selection, each gaming terminal 80 may be configured with a clock to enable to time-stamping of each number selection or group of selections to (For example) thousands of a second in response, for example, to actuation of a selection submission confirmation element 72. In the unlikely event that a timing conflict in number selection would still occur, priority for number selection between a plurality of identical input times may be randomly assigned by central controller 90. Of course, the central controller 90 may also have a clock, which is maintained in synchronicity with the clocks of gaming terminals 80 through communication therebetween via communication links as described herein.

Figure 4:
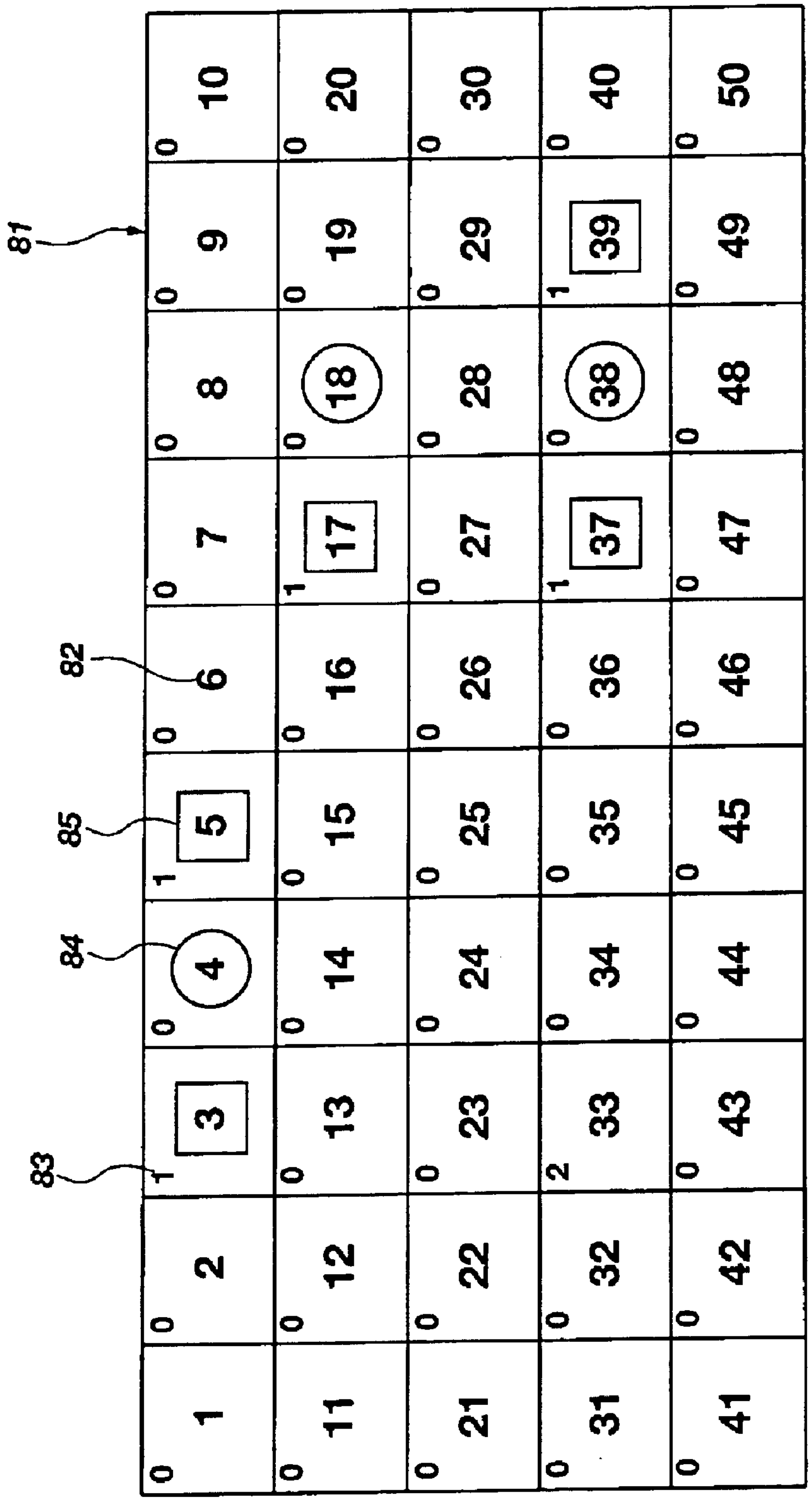
FIG. 4 depicts the further development of the lottery game shown in FIG. 3.

FIG. 4 depicts opponent selected numbers 85 selected by other players on the network, in this case numbers selected by Player B (indicated by the square around the selected number). Numbers selected by opponent players on the network can be represented on a player's gaming terminal display 81 either by a single, common designator (such as the square used in this example) or by a unique designator for each individual. As can be seen from FIG. 4, opponent Player B has selected the numbers 3, 5, 17, 37, and 39. The selection of number 3 by Player B would result in a win for Player B if the numbers 1, 2, or 3 are randomly selected as the winning number because the number 3 is the closest selection to any of those numbers. At the stage of game play depicted in FIG. 4, the selection of numbers 5 and 17 by Player B captures all the numbers between those two numbers, the selection of number 37 effectively captures the numbers 28 through 37 (Player A's selection of number 18 capturing the numbers 18 through 27), and the number 39 effectively captures all numbers larger than 39. Thus Player B controls 38 out of 50 player selectable numbers 82 (giving Player B a 76% probability of winning), as compared to Player A, who controls 12 out of 50 player selectable numbers 82 (giving Player A a 24% probability of winning).

This probabilistic outcome results because the number closest to the randomly selected winning number wins. This is in sharp contrast to conventional lottery games, where player selected numbers must exactly match the randomly drawn winning number to result in a win. Because the player who selects the number closest to the randomly selected winning number 86 wins the award in the present invention, a player that controls a span of unselected numbers enjoys a much improved probability of winning, as compared with prior art lottery games. Consequently, one strategy of the game is to claim ranges of unselected numbers by bounding unselected numbers.

Figure 5:
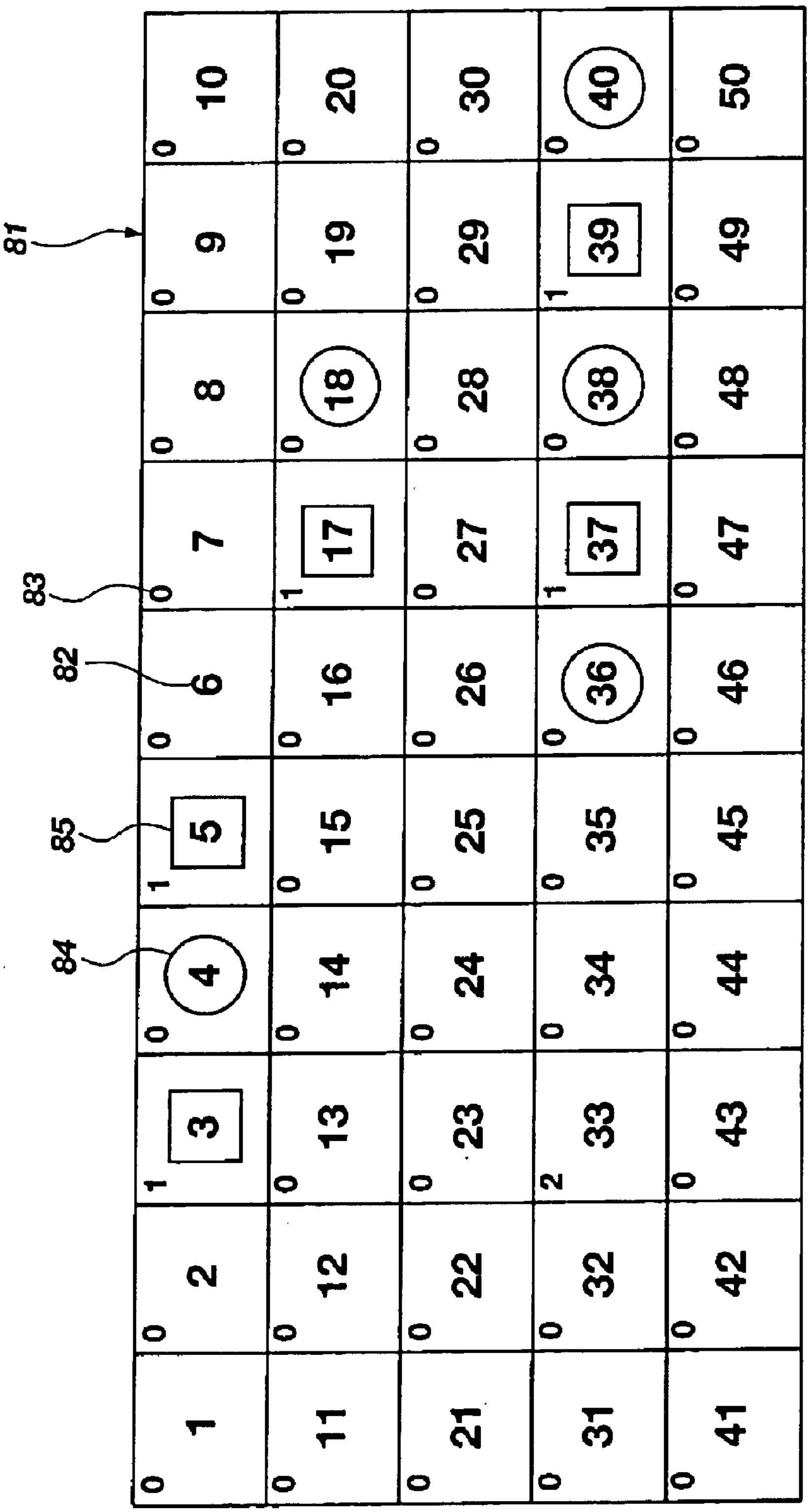
FIG. 5 depicts the further development of the lottery game shown in FIG. 4.

In FIG. 5, Player A carries forward this bounding strategy of capturing blocks of numbers in an effort to counteract Player B's bounding strategy. Player A selects 36 and 40 to frustrate Player B's strategy of bounding the ranges of numbers 28 through 37 and 39 through 50. This relatively simple move by Player A eliminates Player B's control over those ranges and gives Player A control over the ranges of numbers 18 through 36 and 40 through 50. A mere two selections have thus improved Player A's probability of winning from 24%, as depicted in FIG. 4, to 64% and has decreased Player B's probability of winning from 76%, as depicted in FIG. 4, to 36%. Relatively simple moves, such as Player A's moves in FIG. 5, can create highly significant changes in the complexion of the game and in each player's probability of winning the game. As is demonstrated in this example, the use of strategy in the game provides a gaming experience that is drastically different from the lottery games of the prior art. The player interaction and competition provided for in the present invention will improve the entertainment value of the game to both players and spectators, which will result in improved revenues generated by the game for its operator.

In some embodiments of the present invention, any given player selectable number 82 may be selected by more than one player. In other words, duplicate selections of player selectable numbers 82 may or may not be enabled, depending on preset game parameters. Multiple selections of the same number are graphically displayed to allow a player to know the number of times that number has been selected.

For example, as shown in FIG. 4, the small number in the upper left hand corner of each player selectable number 82 is the selection sum 83, which indicates the number of times opponent players have selected that player selectable number 82. Although not shown in the drawings (which only depict a game involving two players), if a plurality of players are playing, the selection sum 83 would be incremented to reflect the total number of times any given player selectable number 82 has been selected by opponent players, that is to say, players other than the player viewing the gaming terminal display 81. In other embodiments, the selection sum 83 might reflect the absolute number of times any given player selectable number 82 has been selected by all players playing the game, including the player on whose gaming terminal display 81 the selection sum 83 is shown.

The fact that any given player selectable number 82 can be selected by more than one player implicates important strategic considerations. For example, the selection of numbers that have a large selection sum 83 reduces the potential jackpot for each player who has selected such numbers because if a multiple selected number is randomly drawn as the winning number, the jackpot will be split among the players who selected that number, reducing the return to each individual winning player. One strategy that may be implemented in the case of a player selectable number 82 having a large selection sum 83 is to "box in" these multiply selected numbers, excluding these players from winning the lottery unless an exact match with the multiply selected number is drawn as the winning number 86. In this manner, a player can increase his probability of winning, or at least his probability of winning a larger jackpot.

The central controller 90 not only updates the gaming terminal displays 81 to show all of the players' selections, but it also determines when the period for player selections is over and randomly selects the winning lottery number. The determination of the duration of the period for player selections is an important aspect of the present invention. If the game play is allowed to proceed too far, too many numbers may be selected, thereby diminishing the strategic nature of the game. If the game is ended too soon, insufficient time is available for players to execute their strategies and allow the game to develop and unfold. Another disadvantage of ending the game too soon is that the game will not have sufficient time to build a significant jackpot (i.e., award), which reduces the incentive for players to participate in the game.

To determine an appropriate point in time to terminate the game, the central controller 90 is provided with an algorithm for determining the end point of the game based on the number of players participating, the number of selections made, the number of duplicate selections, the pace of game play, and any number of other factors determined by the game operator to be significant in, for example, maximizing wagers, maintaining player interest and supporting jackpots of sufficient size to draw players. In other embodiments, such algorithm produces a range of game termination parameters, rather than a specific termination point, so that the game may be terminated with some degree of unpredictability. The game may also be ended randomly at any arbitrary time to enhance the excitement of the game and complicate the strategy of game play.

To add excitement to the game play, players may be given notice of the imminent termination of the game. This creates a last minute opportunity to outmaneuver other players and to make last minute decisions regarding game play. A timer 71 may be displayed on each gaming terminal display 81 to count down the remaining time left in the game. Such a countdown will briefly allow a player to make additional wagers/selections before the timer 71 runs out of time and the game terminates. The introduction of time pressure in the game increases the stress, and thereby the excitement, experienced by the players. It may also encourage players to wager additional amounts because the players will know that there is a reduced potential for other players to thwart the strategic value of such last minute selections.

Figure 6:
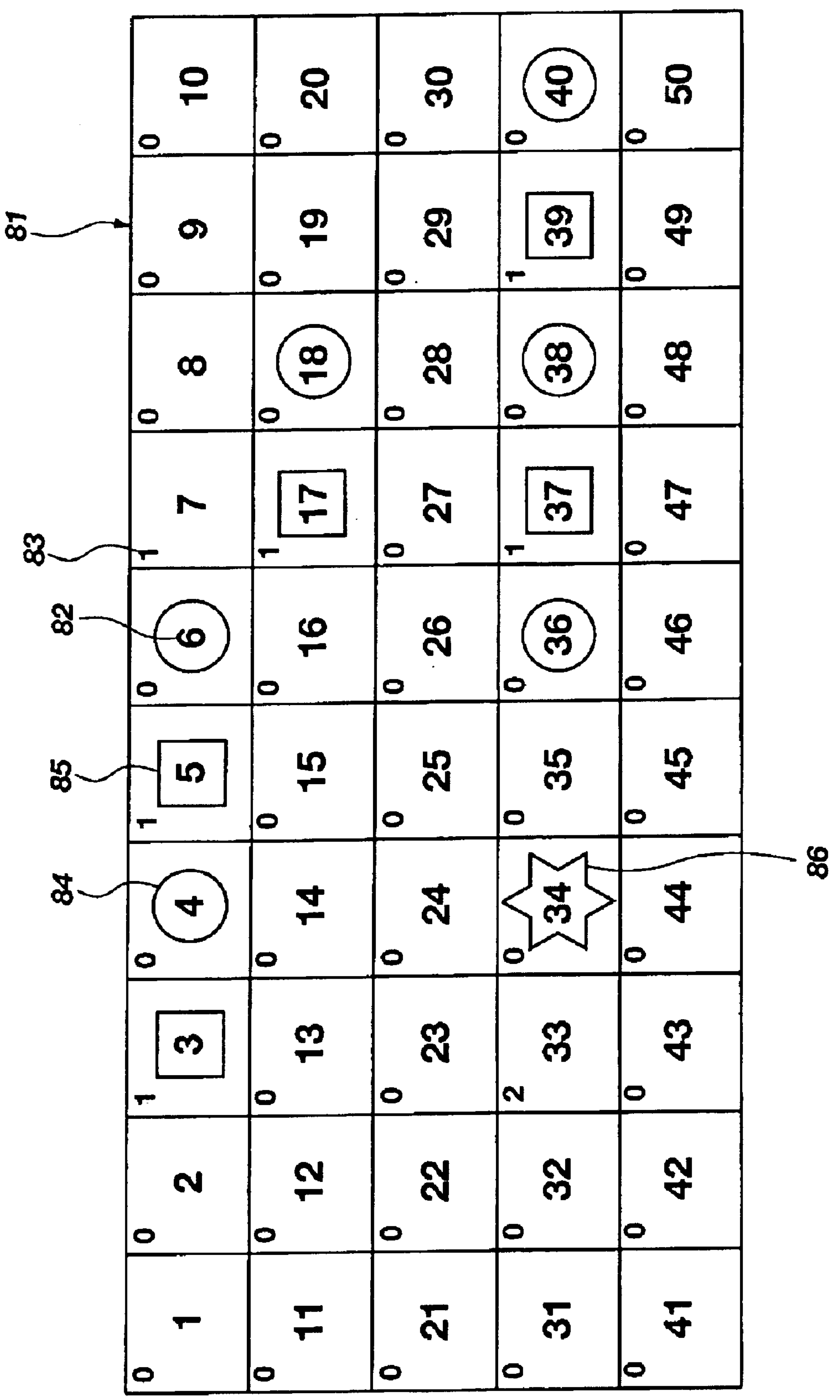
FIG. 6 depicts the further development of the lottery game shown in FIG. 5 with a randomly selected winning number displayed.

At the end of the game, which is depicted in FIG. 6, the central controller 90 randomly selects a winning number (or numbers) in the game's range of player selectable numbers 82 (i.e., randomly selected winning number 86) and determines the winning player(s) (at least by gaming terminal 80, and specifically by player if tracking is employed) who have selected number(s) closest to the randomly selected winning number 86, including exact matches. It is possible, of course, that a win can be achieved by multiple players having selected different numbers if such selections are equidistant from the winning number 86. The central controller 90 determines the winning gaming terminal (or terminals) and displays the winning number(s) 86 on all the gaming terminal displays 81. The central controller 90 may also authorize the payment of the award or crediting of the award to the winning players directly from the gaming terminal 80. Alternately, the award may be paid in person by an attendant.

If more than one player has achieved a win, as in the case of a multiply selected number, the jackpot is split equally between all players who have selected the randomly selected winning number 86. If no player has selected the randomly drawn winning number 86, the player (or players) who have selected the number closest to the randomly selected winning number 86 is awarded the jackpot (or a proportionate share of the jackpot in the case of multiple players with the same winning number). For example, in FIG. 6, the randomly drawn winning number 86 is the number 34, as depicted by the star shape imposed on that number. The closest selected number to the number 34 is 36, which has been selected by Player A. Thus, the winner of the game depicted in FIGS. 3 through 6 is Player A.

In other embodiments, awards may also be made based on additional factors. For example, the first player to select a winning number 86 may be awarded a higher payout than a player who subsequently selects that same number. Runner-up awards may be given to the player that has selected the number second closest to the winning number 86. In further embodiments, the central controller 90 may be programmed to pick multiple randomly drawn winning numbers 86. This may be used as a special bonus feature, especially in heavily played games, that acts to further the excitement of the game and provide added incentive for players to play the game. The use of more than one winning number may be a fixed feature of the gaming, or be added during a round of game play responsive to heavy wagering, or to encourage heavier wagering if play in that round is somewhat sparse.

In currently preferred embodiments of the present invention, the gaming terminals 80 may be situated in a manner such that all players playing at the same gaming location can see each other, enabling each player to monitor, or at least have some audible and visual awareness of, the other players involved in the game. In this way, players can watch the reactions of other players, perceive their pace of game play, and have a more comprehensive overall sensory experience of the game. To further stimulate interest and participation in the game, large common displays, visible to both players and spectators alike, may be provided to exhibit play of the game and other entertaining scenes, such as players' reactions to game outcomes and to each other's strategic moves, as well as the physical antics associated with forceful actuation of the selection submission input confirmation element 72 as players attempt to time their selections, emphasize their selections (at least to themselves), release enthusiasm on the selection submission input confirmation element 72 as a proxy for other players who have become the subject of a player's frustration in the course of playing the game, or otherwise manifest the excitement that builds up in the course of game play.

To make the game more interesting and entertaining for the player, the player's gaming terminal display 81 (or a larger common display) may be configured to provide not only the information concerning the selections made by all the players and the time remaining in the game but also statistical data associated with game play. As a non-limiting example, the gaming terminal display 81 may display the last several player selections (either at that gaming terminal or throughout the network), the total number of players active on the network, the number of selections made on the system within a specified time frame (i.e., the frequency or rate of selections), the awards available, the amounts of awards that have been won in the past, and so on.

The present invention provides added mental stimulation, as compared with prior art lottery-type games, by providing an opportunity to take affirmative action toward obtaining a desired winning number by wagering/selecting one or more numbers at a selected point in time and engaging in strategic selection planning, rather than passively hoping that a to-be-drawn random winning number will be matched to a player-selected number. Alternative embodiments of the present invention also add mental stimulation in the form of uncertainty and stimulation to select numbers rapidly by allowing the central controller's microprocessor to take into account variations in game activity in determining an end point for the game.

As implied above, to add excitement during relatively inactive "lull" periods and to stimulate player action, the microprocessor may be programmed to offer more lucrative games in the form of more frequent drawings of winning numbers to stimulate cash flow by exposing current and prospective players to the excitement of a win, thereby encouraging them to play the game. For example, when the total wagering rate (in terms of cash flow) or the number of wagers placed falls below a certain magnitude for a selected period of time, such as, for example, fifteen minutes, the overall payout ratio may be enhanced or a random "wild" winning number may be inserted in an upcoming range of player selectable numbers.

Although the present description provides an exemplary methodology and system for implementing the present invention, it will be recognized and appreciated by those of ordinary skill in the relevant art that any type of conventional gaming system having a central controller in communication with and in control of any number of gaming terminals may be modified and adapted for implementation of the present invention. Such systems are described in U.S. Pat. Nos. 5,564,700, 5,816,920, 5,885,158, 6,168,521, 6,203,430, and 6,210,275, the disclosures of each of which patents in their entireties are hereby incorporated herein by reference. One exemplary, commercially available, centrally controlled gaming system presently employed in a lottery-type gaming environment and adaptable to implementation of the present invention is the MASTERLINK™ Advanced Gaming System offered by Anchor Gaming of Las Vegas, Nev., through its AWI operating unit, which MASTERLINK™ Advanced Gaming System is based on an IBM RS/6000 server.

The amount of the monetary payouts from the game may be determined by any method known in the art, as determined by the operator of the game. Furthermore, more than one regime for determining monetary payouts may be implemented, enabling the game operator to configure the game to respond to different game conditions with different payout regimes. For example, the central controller may be programmed to respond to a period of low wager volume with more frequent winning number drawings, thereby exposing current and prospective players to a higher level of excitement and creating increased interest in playing the game. As another example, the central controller may be programmed to respond to a period of high wager volume with less frequent winning number drawings to allow larger awards/jackpots to build up, which also increases the excitement of the game for players and spectators. The ordinarily skilled artisan will understand that any number of payout determination regimes may be employed to maximize the excitement and entertainment value of the game for the players and to maximize the profit realized by the operator of the game.

As an illustrative, non-limiting example, a single tier award structure of 50X, wherein X is the amount of a wager, may be used. Every hundredth ($100^{th}$) wager/number selection, network-wide, may produce a winner, for example a $50 winner for a $1 wager. The permitted wager may vary, for example, from $1 to $20 per selection. Similarly, a plurality of numbers may be purchased per wager. A non-casino retailer bonus of, for example, $50, may be issued for every thousandth ($1000^{th}$) wager/selection sold per retail outlet. Thus, the award payout from wagers on the game (not including retailer bonus) would be 50% in this example.

Of course, other tiered award structures employing fixed awards to enable an exact and guaranteed payout ratio (and concomitant game operator hold) may be easily calculated by one of ordinary skill in the art. It is specifically contemplated that, with a multitiered award structure wherein a winning number may qualify for multiple awards, alternative payout schemes may be used at the option of the game operator in setting up the payout determination regime.

Monetary payouts from the game may be issued in any number of ways well-known in the art. Such methods include direct payout of coinage (such being easily effected in a casino environment), payouts from an attendant, or crediting a player identification card, a gaming card that may be credited with funds to be wagered and debited and credited during play, or a bank debit card or the like. Although it is possible to wager with coinage and bills and receive currency payouts, such an approach being easily effected in a retail environment such as a convenience store having an attendant-served game terminal, in some environments it may be preferred that credit/debit/cash cards be employed, particularly if rapid betting and multiple bets to secure groups of numbers are to be facilitated. The advantage of these types of cards is that they allow instantaneous wagering and facilitate timing of wagering without the need to feed additional coins to the game terminal. In a hotly contested game where speed and timing of wagering may become an important factor for winning, the inability to immediately make a wager and select a number may place a player at a disadvantage. With the placement of a card in the machine, the player can pay full attention to the progress of the game and immediately select numbers at times of his or her choice without the hindrance of feeding the game terminal with additional currency. An additional advantage of using non-currency methods of wagering is that players are less cognizant of the amounts they are wagering than they are when wagering actual currency, which often results in higher levels of wagering and, thus, improved profitability of the game.

While disclosed herein principally as a stand-alone game, it is also contemplated (as referenced previously herein with respect to FIG. 8) that the lottery-type game of the present invention may be implemented as a bonus game associated with a base or primary game, particularly in a casino environment where secondary or bonus games are well-received by players. In so doing, and by way of example, a player may win points in play of the primary game, the points being representative of a number of number selections made available to the player in a bonus round comprising the lottery-type game of the present invention. Alternatively or in addition, certain specific outcomes in the primary game may be used to initiate an automatic number selection in a bonus game comprising the lottery-type game of the present invention.

The game of the present invention provides numerous advantages over the prior art, with respect to both the game operator and players. For example, the game is a unique "niche" game that can be easily added to gaming in a casino or lottery environment and is particularly attractive in that it can be implemented through an existing lottery network, which may already include gaming terminals for other lottery-type games. Furthermore, the game exhibits a perpetual, self-funding prize structure as the game progresses, and profitability is optimized and predictable as the exact percentage of wagers to be issued as winnings may be determined in advance. In addition, there is a minimal additional investment by the game operator, as the present invention is point-of-sale driven and requires no play slip, drawing or associated promotion. The game will enable widespread participation and is not required to be targeted at a particular population segment. The timing feature of the game provides an entertaining, "gun for win" factor that is absent from most games of chance, particularly lottery-type games.

Further, for game operators, the game is risk free as compared to instant win tickets, conventional pool games, and fixed "xyz" payout tiers, as the operator knows the identity and frequency of occurrence of the winning numbers and the awards associated therewith. In comparison, in most lottery-type games, the house (lottery operator) is always at risk. For example, with instant win tickets, a game may not sell out, causing more prizes to be paid than tickets sold, especially if the top prize is won early in the game. With other lottery-type games, fixed top tier prizes and/or fixed lower tier prizes often diminish profits from the game. With pool-type games (such as picking three of four numbers), if a popular number such as 111 hits, the operator may face a huge loss. In addition, the manner in which awards may be made, such as, for example, awarding $50 on a $1 wager for every one hundred number selections and, thus, a 50% payout with some degree of predictability, is attractive to players who may wager in the hope of getting a real and significant return. Of course, additional, higher award tiers may be structured for a higher overall payout that is offset by increased attractiveness of the game due to the availability of higher awards in addition to the basic (for example, every one hundredth selection) awards.

The present invention, while described in the context of certain exemplary embodiments, is not to be limited thereby, and those of ordinary skill in the art will readily understand and appreciate that additions and modifications to, as well as deletions from, the disclosed embodiments may be made without departing from the spirit and scope of the invention. Similarly, features from different embodiments may be combined while remaining within the scope of the invention.

What is claimed is:

1. A gaming method, comprising the steps of:

determining that a first player has made a wager;

determining that a first player has selected a first game element from a set of game elements, the first game element being known to the first player when the first game element is selected;

determining that a second player has made a wager;

determining that a second player has selected a second game element from the set of game elements, the second game element being known to the second player when the second game element is selected;

selecting a winning game element from the set or game elements;

determining a game outcome according to a closeness of the first game element selected by the first player and a closeness of the second game element selected by the second player to a winning game element;

determining a payout according the game outcome, wherein the closeness is defined by at least one of mathematical closeness and physical closeness; and awarding the payout to a player according to the game outcome.

2. The gaming method according to claim 1, wherein the set of game elements are arranged in matrix form, and the closeness of the game element to the winning game element being determined by a physical dimension in one of a vertical, a horizontal and a diagonal direction.

3. The gaming method according to claim 1, wherein the set of game elements are arranged in a range from first to last, and the closeness of the game element to the winning game element being determined with the range closed such that the first follows the last.

4. The gaming method according to claim 1, wherein the set of game elements are arranged in a range from first to last, and the closeness of the game element to the winning game element being determined with the range open such that the first does not follow the last.

5. A gaming method, comprising the steps of:

determining that each of a plurality of players has made a wager;

determining that each of the plurality of players has selected at least one number from a set of numbers, the at least one number known when the at least one number is selected;

selecting at least one winning number from the set of numbers;

determining a game outcome according to a closeness of the at least one number selected by each of the plurality of players to the at least one winning number;

determining a payout according the game outcome, wherein the closeness is defined by at least one of mathematical closeness and physical closeness; and awarding the payout to a player according to the game outcome.

6. The gaming method according to claim 5, wherein the set of numbers are arranged in matrix form, and the closeness of the at least one number selected by each of the plurality of players to the at least one winning number being determined by a physical dimension in one of a vertical, a horizontal and a diagonal direction.

7. The gaming method according to claim 5, wherein a set of numbers are arranged in a range from first to last, and the closeness of the at least one number selected by each of the plurality of players to the at least one winning number being determined with the range closed such that the first follows the last.

8. The gaming method according to claim $, wherein a set of numbers are arranged in a range from first to last, and the closeness of the at least one number selected by each of the plurality of players to the at least one winning number being determined with the range open such that the first does not follow the last.

9. A gaming method, comprising:

a step for determining that each of a plurality of players has made a wager;

a step for determining that each of the plurality of players has selected at least one number from a set of numbers, the at least one number known when the at least one number is selected;

a step for selecting at least one winning number from the set of numbers;

a step for determining a game outcome according to a closeness of the at least one number selected by each of the plurality of players to the at least one winning number;

a step for determining a payout according the game outcome, wherein the closeness is defined by at least one of mathematical closeness and physical closeness; and a step for awarding the payout to a player according to the game outcome.

* * * * *